United States Patent Office 3,382,398
Patented May 7, 1968

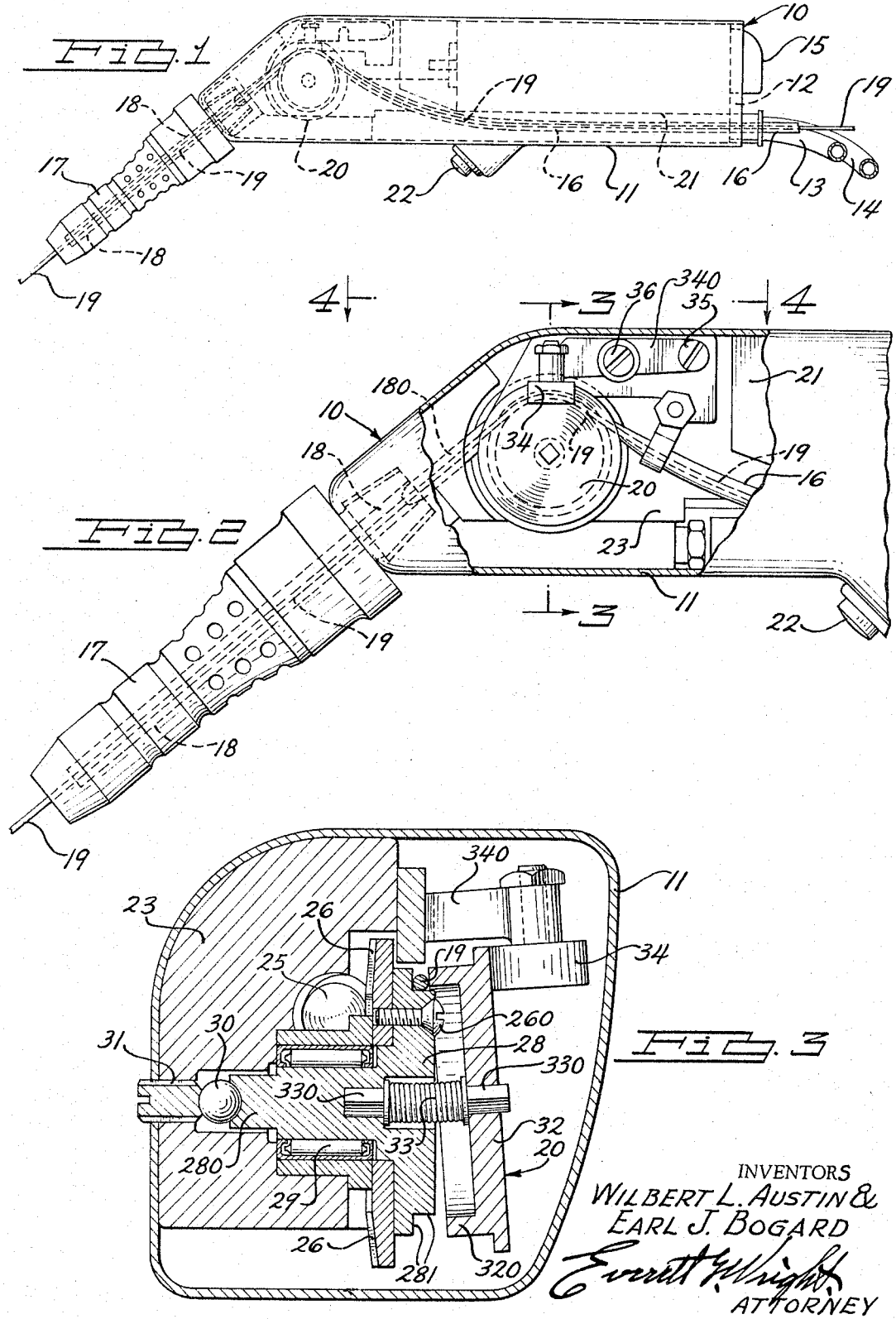

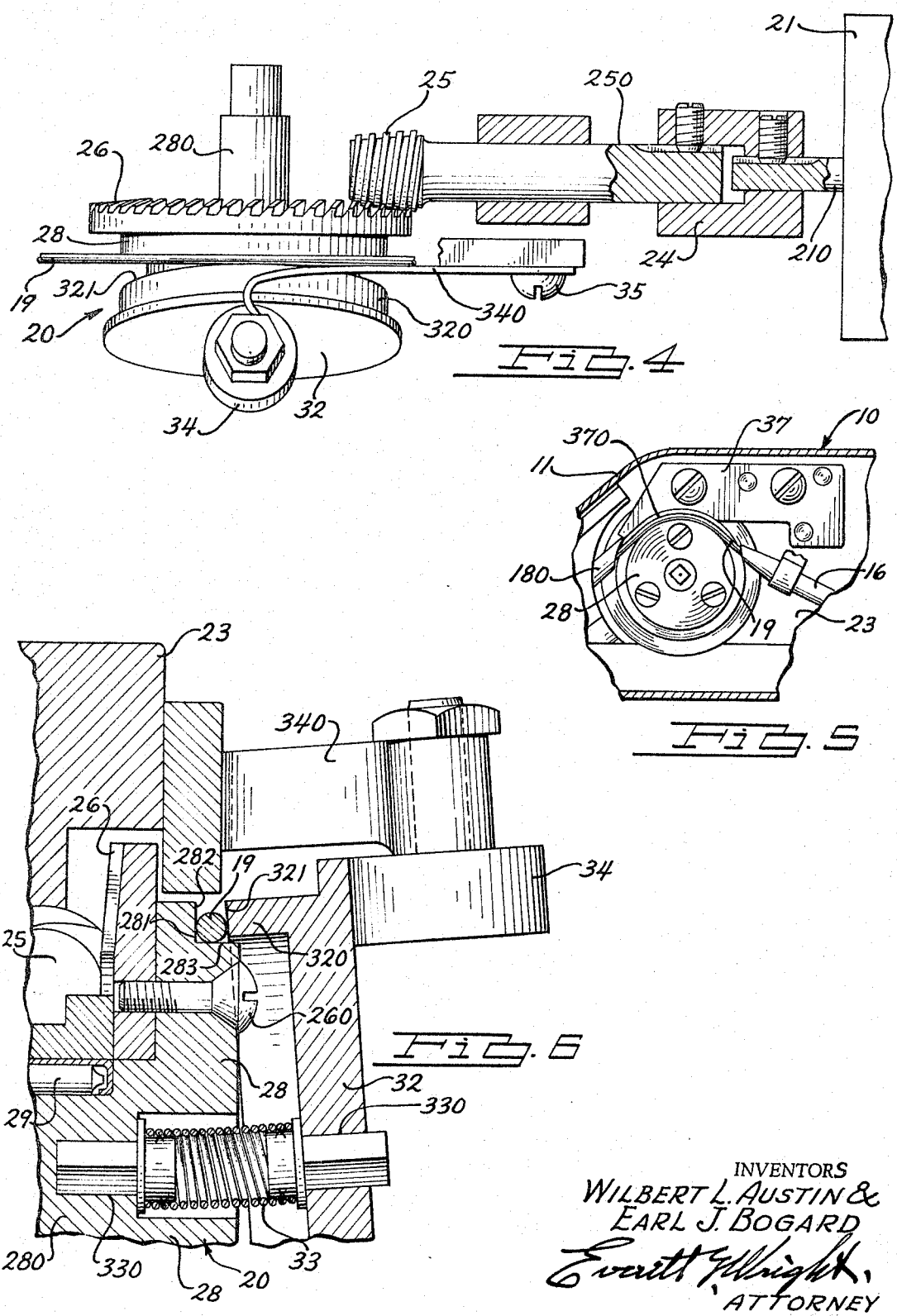

3,382,398
WELDING WIRE FEED MEANS FOR
WELDING GUNS
Wilbert L. Austin, 441 Colonial Court, Grosse Pointe
Farms, Mich. 48236, and Earl J. Bogard, 20626
Whitlock, Dearborn Heights, Mich. 48127
Filed Aug. 8, 1966, Ser. No. 571,003
4 Claims. (Cl. 314—69)

This invention relates to means for feeding welding wire through welding guns and the like, and in particular to positive means for feeding relatively small diameter welding wire through a welding gun.

The primary object of the instant invention is to provide in a welding gun an improved positive pull-push means for feeding small diameter welding wire through the welding gun, which pull-push means, although applicable to handle all sizes of welding wire, is particularly desirable for use in lightweight hand operated welding guns employing small and extremely small diameter welding wire, all without deformation, flattening or kinking of the welding wire fed thereby.

A further object of the invention is to provide a wire feed device employing simple wire gripping feed means which is not only positive in operation and requires a minimum of service, but which can be readily maintained when and as necessary.

Other objects of the invention will become apparent by reference to the following detailed description taken in connection with the accompanying drawings, in which:

FIG. 1 is a side elevational view of a hand welding gun employing welding wire feed means of the invention.

FIG. 2 is an enlarged fragmentary side elevational view of the welding gun disclosed in FIG. 1 with a portion of the housing broken away showing a side view of the welding wire feed mechanism.

FIG. 3 is an enlarged sectional view taken on the line 3—3 of FIG. 2.

FIG. 4 is a skeletonized top plan view taken on the line 4—4 of FIG. 2 showing a preferred mechanism for driving the welding wire feed means.

FIG. 5 is a side elevational view of the inner power driven wire feed disc and wire guide with the outer welding wire feed plate removed.

FIG. 6 is a greatly enlarged detailed fragmentary sectional view similar to FIG. 3 showing the positive pull-push wire feed means of the invention including its preferred drive means and the relationship between the wire gripping feed disc and feed plate.

Referring now to the drawings wherein like reference characters refer to like and corresponding parts throughout the several views, the particular welding wire feed means embodying the instant invention is disclosed as an element of a hand welding gun 10 having a hand grip size housing 11 closed at its rear end 12 which is suitably apertured to accommodate a welding current cable 13, a feed motor cable 14, a motor speed control switch 15, and the entering welding wire guide 16. On the forward end of the said housing 11 is mounted a welding gun nozzle 17 having therein a pay-out welding wire guide 18. Welding wire 19 extends from a suitable coil or reel, not shown, to and through the entering welding wire guide 16, through a positive acting pull-push welding wire feed means embodying the invention designated generally by the numeral 20, and through and out of the said pay-out welding wire guide 18 of the nozzle 17 of the welding gun 10. A suitable pay-out welding wire guide nipple 180 is interposed between the push-pull welding wire feed means 20 and the said pay-out welding wire guide 18 of the welding gun nozzle 17.

Current from the feed motor cable 14 is preferably supplied intermittently to the electric motor 21 of the positive acting pull-push welding wire feed means 20 through an ON-OFF switch 22 of the spring loaded open-push button closed type, which switch 22 may be mounted in a suitable location on the hand grip size housing 11. The welding current cable 13 is connected to the welding wire feed means 20 at a suitable point, not shown, to provide welding current from a welding current source to welding wire 19 as it is fed through the said welding wire feed means 20. A second welding current cable (not shown) is suitably connected from the welding current source to the work to be welded. Inasmuch as the feed motor circuit and the welding current circuit are conventional, and may be varied should welding guns embodying the invention be employed with semi-automatic or automatic welding installations, the specific circuits employed need not be shown or described in detail.

The embodiment of the welding wire feed means 20 of the invention discloses for illustrative purposes is preferably completely incorporated in a welding gun 10 and includes a base or mounting block 23 around which is preferably fixed in the welding gun housing 11. The electric motor 21 which drives the welding wire feed means 20 also is mounted in the welding gun housing 11. The motor shaft 210 is coupled by a suitable coupling 24 to the worm gear shaft 250 of the worm gear 25 which drives the welding wire feed means 20 through a spiral bevel gear 26.

The welding wire feed means 20 preferably consists essentially of a power driven feed disc 28 including a central shaft 280 having an annular angular wire seat 281 at the outer periphery thereof rotatably mounted in the said base or mounting block 23 by means of a roller bearing 29 and a thrust bearing 30 adjustable by an adjustment screw 31. The said power driven feed disc 28 has the spiral bevel gear 26 fixed thereto by such suitable means as studs 260, and is driven by the electric motor 21 through the worm gear 25 and spiral gear 26 under control of the ON-OFF spring loaded open-manually closed switch 22. A motor speed control means, not shown, operated by the motor speed control switch 15 is preferably built into the said motor 21 whereby to select the speed at which the welding wire 19 is fed by the welding wire feed means 20 through the welding gun nozzle 17.

A welding wire feed plate 32 is floatingly mounted axially on the power driven feed disc 28 by means of a central preferably coil spring flexible shaft 33 which is preferably keyed at 330 to the said power driven feed disc 28 and at 331 to the welding wire feed plate 32 as best shown in FIGS. 3 and 6. The said welding wire feed plate 32 is provided with a narrow axially disposed annular welding wire bearing lip 320 sized to permit the annular bearing surface 321 of the said annular bearing lip 320 to contact the welding wire 19 and urge it to bottom against both the axially and radially disposed faces 282 and 283 respectively of the annular angular wire seat 281 of the power driven feed disc 28 responsive to the axial tilting of the welding wire feed plate 32 under the force of spring pressure applied thereto by a spring loaded pressure roller 34 carried by a spring arm 340 secured to the base or mounting block 23 by means of a stud 35. A suitable spring pressure adjusting screw 36 is employed to regulate the spring pressure of the pressure roller 34 on the welding wire feed plate 32. A suitable welding wire guide bar 37 is secured to the base or mounting block 23 and has an arcuate portion 370 which is preferably employed to prevent the welding wire 19 from leaving the annular angular welding wire seat 281 of the power driven feed disc 28 should the pay-out welding wire guide 18 of the welding wire gun nozzle 17 or the pay-out welding wire guide nipple 180 become obstructed.

It should be noted that the coil spring flexible shaft 33 employed to floatingly mount the welding wire feed plate 32 on the power driven feed disc 28 must be of sufficient strength to drive the welding wire feed plate 32 for rotation in unison with the power driven feed disc 28, and also, the said coil spring flexible shaft 33 must be able to flex as best shown in FIG. 5 out of its normal axial attitude with respect to the power driven feed plate 28 and its central shaft 280 responsive to pressure applied to the welding wire feed plate 32 by the spring loaded pressure roller 34 which causes the annular bearing surface 321 of the annular lip 320 of the welding wire feed plate 32 and the axial and radial bearing faces 282 and 283 of the angular wire seat 281 of the power driven feed disc 28 to constantly and firmly yet resiliently engage and grip the welding wire 29 simultaneously at three points progressively advancing it through the positive acting pull-push welding wire feed means 20 from a coil or the like through the welding gun 10 whenever and for the period of time current is applied to the electric motor 21 by such means as momentarily closing the spring loaded open-push button closed ON-OFF switch 22.

Although but a single embodiment of the invention has been disclosed and described in detail, it is obvious that many changes may be made in the size, shape, arrangement and details of the various elements of the invention, all without departing from the spirit and scope of the appended claims.

We claim:

1. Means for feeding welding wire through welding guns and the like comprising
    a power driven welding wire feed disc having an axially and radially disposed angular welding wire seat formed around the periphery thereof accommodating a welding wire therein,
    a welding wire feed plate including an annular bearing lip having an annular axially disposed bearing surface,
    power means driving said welding wire feed disc,
    resilient coupling means keyed centrally to said power driven wire feed disc and said wire feed plate supporting said wire feed plate in axial spaced relationship with respect to said power driven wire feed disc and rotatable therewith,
    and a spring loaded pressure roller means contacting said welding wire feed plate causing said welding wire feed plate to tilt and bring the annular axially disposed bearing surface thereof into engagement with a welding wire disposed in the welding wire seat of said welding wire feed disc opposite the point of contact of the said spring loaded pressure roller on said wire feed plate whereby to positively grip and feed said welding wire through said welding gun.

2. Means for feeding welding wire through welding guns and the like as claimed in claim 1 including
    means for actuating said power means intermittently for selected periods of time.

3. Means for feeding welding wire through welding guns and the like as claimed in claim 1 wherein
    said resilient coupling means comprises a coil spring of sufficient strength to cause said power driven feed disc to drive and floatingly support said wire feed plate yet permitting it to tilt and continuously engage said welding wire opposite said spring loaded pressure roller as said feed disc and said feed plate rotate in unison.

4. Means for feeding welding wire through welding guns and the like as claimed in claim 1 including
    means for adjusting the spring pressure on said spring loaded pressure roller means.

References Cited

UNITED STATES PATENTS

| | | | |
|---|---|---|---|
| 3,193,254 | 7/1965 | Minnick | 254—138 X |
| 3,203,608 | 8/1965 | Mogolis | 226—182 X |
| 3,253,116 | 5/1966 | Kensrue | 219—130 |

BERNARD A. GILHEANY, *Primary Examiner.*

R. N. ENVALL, JR., *Assistant Examiner.*